United States Patent
Yajima (10) Patent No.: US 11,982,220 B2
(45) Date of Patent: May 14, 2024

(54) THERMO-VALVE AND THERMO-VALVE CONNECTING BODY

(71) Applicant: NIPPON THERMOSTAT CO., LTD., Kiyose (JP)

(72) Inventor: Noriyasu Yajima, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/032,716

(22) PCT Filed: Sep. 9, 2021

(86) PCT No.: PCT/JP2021/033134
§ 371 (c)(1),
(2) Date: Apr. 19, 2023

(87) PCT Pub. No.: WO2022/102230
PCT Pub. Date: May 19, 2022

(65) Prior Publication Data
US 2023/0383690 A1    Nov. 30, 2023

(30) Foreign Application Priority Data
Nov. 16, 2020  (JP) ................................ 2020-190117

(51) Int. Cl.
*F01P 7/16* (2006.01)
*F16K 27/00* (2006.01)
(Continued)

(52) U.S. Cl.
CPC .............. *F01P 7/16* (2013.01); *F16K 27/003* (2013.01); *F16K 27/0263* (2013.01); *F16K 31/002* (2013.01)

(58) Field of Classification Search
CPC ...... F01P 7/16; F16K 27/003; F16K 27/0263; F16K 31/002
See application file for complete search history.

(56) References Cited

U.S. PATENT DOCUMENTS

| 10,494,983 B2 | 12/2019 | Morota et al. |
| 11,009,051 B2 * | 5/2021 | Biwersi .............. F15B 13/0402 |
| 2006/0081200 A1 * | 4/2006 | Cardinali .................. F01P 7/16 123/41.1 |

FOREIGN PATENT DOCUMENTS

| JP | S58-001626 Y2 | 1/1983 |
| JP | H02-004927 U | 1/1990 |

(Continued)

OTHER PUBLICATIONS

Machine translation, WO2019093060, published May 16, 2019, obtained from https://worldwide.espacenet.com/, pp. 1-8.*

(Continued)

*Primary Examiner* — Grant Moubry
(74) *Attorney, Agent, or Firm* — HAUPTMAN HAM, LLP (57) ABSTRACT

Provided is a thermos-valve connecting body with which attachment work is simplified by integrating a plurality of thermos-valves. The thermos-valve includes: a housing; a thermos-element that includes a temperature-sensing unit that senses the temperature of a coolant, that opens and closes one flow path in accordance with the temperature of the coolant, and that is housed inside the housing; and a connecting part formed on the housing and attached to another thermos-valve. The thermos-valve connecting body enables one thermos-valve to be attached to a connecting part of the other thermos-valve by the connecting part formed on the housing, and the one thermos-valve and the other thermos-valve to be formed integrally.

13 Claims, 10 Drawing Sheets

(51) Int. Cl.
 *F16K 27/02* (2006.01)
 *F16K 31/00* (2006.01)

(56) References Cited

FOREIGN PATENT DOCUMENTS

| JP | 2009-222217 A | 10/2009 |
| JP | 6679324 B2 | 4/2020 |
| WO | 2019-093060 A1 | 5/2019 |

OTHER PUBLICATIONS

PCT/ISA/210, "International Search Report for PCT International Application No. PCT/JP2021/033134," Nov. 2, 2021.

* cited by examiner

THERMO-VALVE AND THERMO-VALVE CONNECTING BODY

RELATED APPLICATIONS

The present application is National Phase of International Application No. PCT/JP2021/033134 filed Sep. 9, 2021, and claims priority from Japanese Application No. 2020-190117, filed Nov. 16, 2020, the disclosure of which is hereby incorporated by reference herein in its entirety.

TECHNICAL FIELD

This invention relates to a thermo-valve and a thermo-valve connecting body, specifically to a thermo-valve connectable to a plurality of thermo-valves and a thermo-valve connecting body composed of a plurality of connected thermo-valves.

BACKGROUND ART

Thermo-valves have been used in many technical fields and are used in a cooling system of an internal combustion engine for a vehicle, for example. The thermo-valves used in a cooling system of an internal combustion engine of a vehicle will be described based on FIG. 15.

Figure 15:
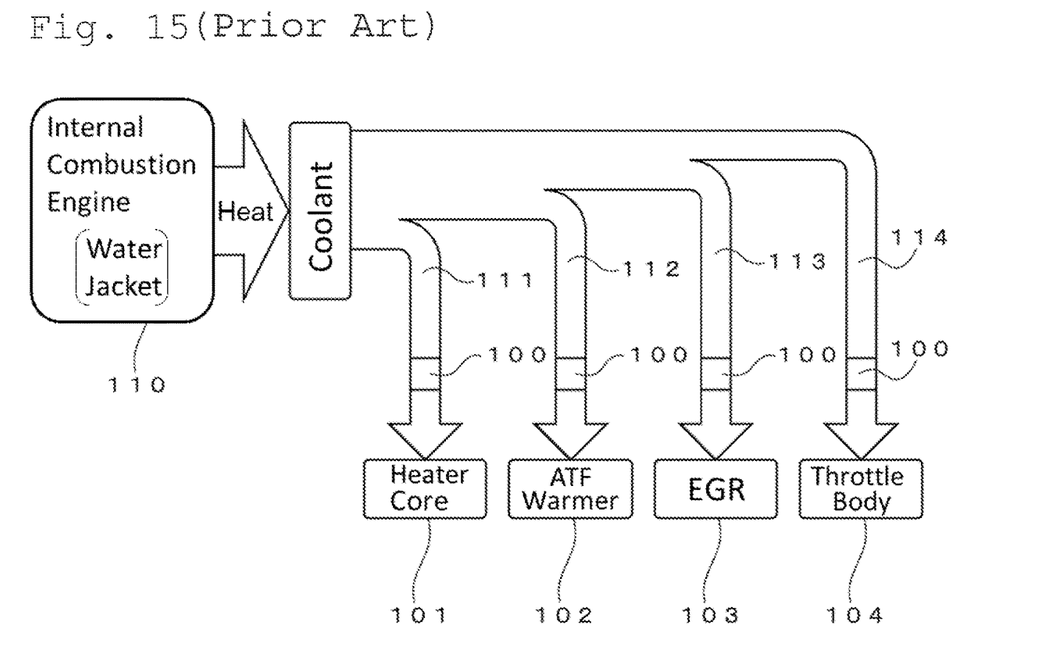
FIG. 15 is a conceptual view illustrating the thermo-valve for the cooling system of the internal combustion engine for automobiles.

As shown in FIG. 15, to deliver a coolant for cooling the internal combustion engine 110 to devices such as a heater core 101, an ATF warmer 102, an EGR (exhaust gas recirculation) 103, and a throttle body 104, thermo-valves 100 are disposed in each of pipes 111, 112, 113, and 114 which are connected to the respective devices.

For example, as for the thermo-valve 100 disposed between the internal combustion engine 110 and the heater core 101, opening the thermo-valve 100 allows the coolant to flow from the internal combustion engine to the heater core 101, and closing the thermo-valve 100 shuts the flow of the coolant.

The thermo-valve 100 is a wax-type thermo-valve. As shown in PTL 1, for example, a temperature sensing unit is disposed in a housing thereof, and the temperature of the coolant causes the temperature sensing unit to extend or contract. The valve element operated by the extension or contraction of the temperature sensing unit opens or closes a coolant path to control the flow of the coolant.

Thus, in the cooling system of the internal combustion engine for the vehicle, the thermo-valves 100 respectively disposed in pipes 111, 112, 113, and 114 connected to each of the devices control the coolant flow in the respective pipes 111, 112, 113, and 114.

PTL 2 discloses a motor-operated valve with a thermo-valve, as the one that controls the coolant flow of multiple pipes.

Figure 16:
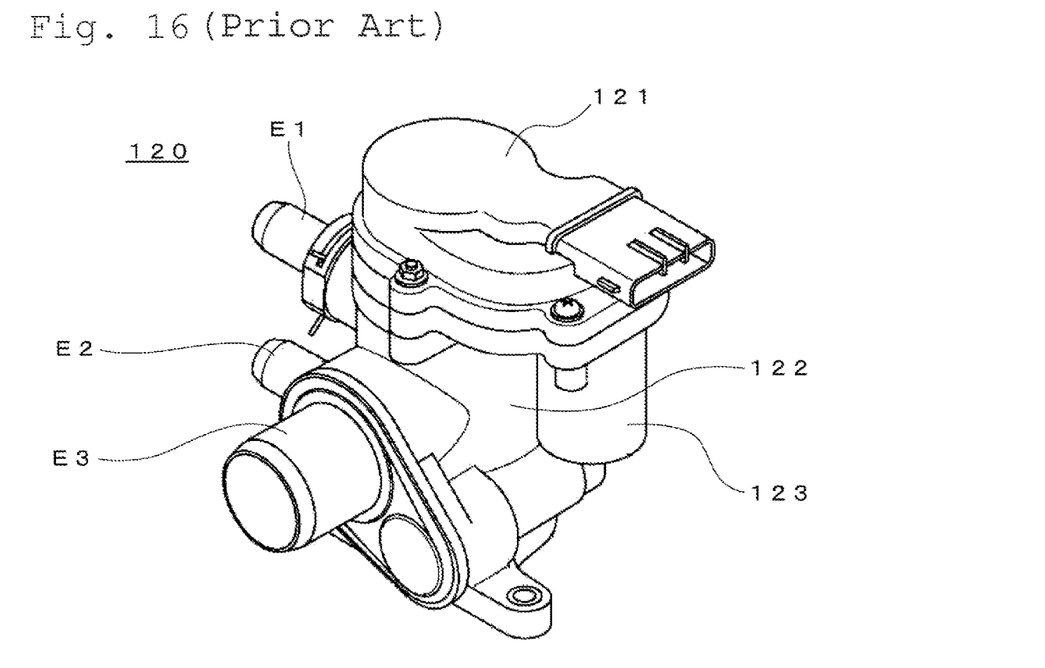
FIG. 16 is a perspective view showing a conventional motor-operated valve with a thermo-valve.

The motor-operated valve with a thermo-valve 120 is provided with a reduction gear housed in a reduction gear housing 121, a valve element housed in a valve housing 122, and an electric motor housed in a motor housing 123, as shown in FIG. 16.

The rotation of the electric motor is decelerated with the reduction gear, and a rotary shaft coupled to the reduction gear rotates (operates) the valve element. The electric motor, controlled by an electronic control unit (ECU) mounted in a vehicle, performs rotation control of the valve element via the reduction gear depending on the vehicle status.

A first communication port E1 of the motor-operated valve 120 with a thermo-valve shown in FIG. 16 communicates with a pipe connected to a heater core. A second communication port E2 communicates with a pipe connected to an oil cooler. A communication port E3 communicates with a pipe connected to a radiator.

Further, though not shown in drawings, a thermo-valve as a fail-safe mechanism is equipped to the third communication port E3 and enables the communication between the valve element housing 122 and the third communication port E3 when the valve element cannot be driven due to a failure, or the pressure or the temperature of the coolant reaches a predetermined value.

The motor-operated valve 120 with thermo-valve controls the flows of the coolant in the respective pipes with the motor-operated valve. When the coolant temperature rises high at the time of the failure, the thermo-valve as the fail-safe mechanism opens to secure a supply path for the coolant to the radiator to prevent the internal combustion engine ENG from overheating.

CITATION LIST

Patent Literature

PTL 1: JP-A-2009-222217
PTL 2: Japanese Patent No. 6679324

SUMMARY OF INVENTION

Technical Problem

As disclosed in PTL 1, one thermo-valve is disposed in one pipeline and controls the coolant flow therein. Thus, a thermo-valve is disposed in each of the pipelines. As a result, distributed arrangement of thermo-valves in a cooling system causes the mounting work to be complicated.

Since one thermo-valve is for one pipeline, the control of the coolant flow in the flow path can be done only at a specific temperature at which the temperature sensing unit of the thermo-valve reacts but not possible at another temperature.

As for the motor-operated valve with a thermo-valve described in PTL 2, a single motor-operated valve can deliver the coolant to each device. Since the thermo-valve as a fail-safe mechanism and the motor-operated valve are provided in an integrated unit, the motor-operated valve with the thermo-valve becomes larger in size, poorly mountable in a vehicle, and expensive.

The present invention aims at providing a thermo-valve, not a motor-operated valve with a thermo-valve, for integrally forming plural thermo-valves causing to make mounting work easy.

In addition, the present invention aims at providing a thermo-valve connecting body with which the control of the coolant flow can be achieved at plural specific temperatures by integration of plural thermo-valves.

Solution of Problem

A thermo-valve according to the present invention to solve the above problem is characterized in that the thermo-valve includes a housing in which a one flow path coolant passing through is formed, a thermo-element, accommodated in the housing, which includes a temperature sensing unit to sense the coolant temperature and which opens and closes the one flow path in accordance with the coolant temperature, and a connecting part that is formed in the housing and is to be attached to another thermo-valve.

As described above, the one thermo-valve is connected to a connecting part of the other thermo-valve using the connecting part formed in the housing. Thus, each of the thermo-valves is not necessary to be directly attached to a cooling system with a respective fixing means. The thermo-valves can be attached to the cooling system by attaching the one thermo-valve to the other thermo-valve. Accordingly, the number of thermo-valves that are directly attached to the cooling system with fixing means can be reduced, which makes mounting work easy.

A thermo-valve connecting body according to the present invention to solve the problem is provided with one thermo-valve which includes a housing in which one flow path a coolant passes through is formed, a thermo-element accommodated in the housing including a temperature sensing unit to sense the coolant temperature and to open and close the one flow path in accordance with the coolant temperature, and a connecting part formed in the housing to be attached to the other thermo-valve; and another thermo-valve which includes a housing in which one flow path a coolant passes through is formed, a thermo-element accommodated in the housing including a temperature sensing unit to sense the coolant temperature and to open and close the one flow path in accordance with the coolant temperature, and a connecting part formed in the housing to be attached to the one thermo-valve, wherein the one thermo-valve is attached to the connecting part of the other thermo-valve by the connecting part formed in the housing so that the one thermo-valve and the other thermo-valve are integrally formed.

Since the one thermo-valve is connected to a connection port of the other thermo-valve using the connecting part formed in the housing and the one thermo-valve is integrally formed with the other thermo-valve, which makes mounting work easy.

That is, the one thermo-valve and the other thermo-valve are not necessary to be mounted independently directly on the cooling system using each of the fixing means, and only the integrated thermo-valve composed of the one and other thermo-valves are mounted on the cooling system, which makes the mounting work easy.

A thermo-valve according to the present invention to solve the problem is provided with a housing in which a one flow path where a coolant passes through is formed, a thermo-element accommodated in the housing including a temperature sensing unit to sense the coolant temperature and, to open and close the one flow path in accordance with the coolant temperature, another flow path intersecting with the one flow path, and a delivery inlet and outlet of the other flow path, which are connecting parts formed protruding from the housing, wherein the one thermo-valve and another thermo-valve are integrally formed connecting by fitting the delivery inlet or outlet of the flow path of the one thermo-valve to a delivery inlet or outlet of another flow path of another thermo-valve.

As described above, the one thermo-valve and the other thermo-valve are integrally formed by connecting by fitting the delivery inlet and outlet of the other flow path intersecting with the one flow path to a delivery inlet and outlet of the other flow path of the other thermo-valve. Consequently, as described above, the integrated thermo-valve to the cooling system has only to be mounted, making the mounting work easy.

By setting the open-close temperature (working temperature) of the other thermo-valve to a different temperature compared to the open-close temperature of the one thermo-valve, the opening and closing of the flow path of each of the thermo-valve can be performed at different temperatures by the coolant flowing in from the other delivery inlet. Namely, the flow control of each thermo-valve can be achieved at plural specific temperatures.

A thermo-valve connecting body according to the present invention to solve the problem is provided with a one thermo-valve which includes a housing in which a one flow path that a coolant passes through is formed, a thermo-element accommodated in the housing including a temperature sensing unit to sense the coolant temperature and to open and close the one flow path in accordance with the coolant temperature, and a delivery inlet and outlet of another flow path as a connecting part protruding from the housing where the one flow path and the other flow path are intersecting;

and another thermo-valve which includes a housing in which a one flow path that a coolant passes through is formed, a thermo-element accommodated in the housing including a temperature sensing unit to sense the coolant temperature and to open and close the one flow path in accordance with the coolant temperature, and a delivery inlet and outlet of another flow path as a connecting part protruding from the housing where the one flow path and the other flow path are intersecting, wherein the delivery inlet and outlet of the one thermo-valve are connected with the delivery inlet and outlet of the other thermo-valve by fitting and the one thermo-valve and the other thermo-valve are integrally formed.

Thus, since the delivery inlet or outlet of the other flow path of the one thermo-valve connected with the delivery inlet or outlet of the other flow path of the other thermo-valve by fitting and the one thermo-valve and the other thermo-valve are integrally formed consequently, as described above, only the mounting of the integrated thermo-valve to the cooling system has to be done, which makes the mounting work easy.

By setting the open-close temperature (working temperature) of the other thermo-valve to a different temperature compared to the open-close temperature of the one thermo-valve, the opening and closing of the flow path of each of the thermo-valve can be performed at different temperatures by the coolant flowing in from the other delivery inlet. Namely, the flow control of each thermo-valve can be achieved at plural specific temperatures.

The inner radius of the delivery inlet and outlet of the other flow path, being the connecting part of the one thermo-valve is desirably formed larger than the outer diameter of the delivery inlet and outlet of the other flow path, being the connecting part of the other thermo-valve.

Further, it is desirable that the delivery inlet and outlet of the other flow path of the one thermo-valve are attached to the delivery inlet or outlet of the other flow path of the other thermo-valve at an arbitrarily predetermined angle and the one thermo-valve and the other thermo-valve are welded.

Since the delivery inlet and outlet of the other flow path of the one thermo-valve are attached to the delivery inlet and outlet of the other flow path of the other thermo-valve at an arbitrarily predetermined angle and welded, it is possible to set the attaching angle to an arbitrarily predetermined angle according to the design specification and to attach and weld the both at such an angle. The welding of the one thermo-valve to the other thermo-valve can avoid to prevent them from separating.

The welding may be carried out by laser welding or ultrasonic vibration welding.

It is desirable that the delivery inlet or outlet of the other flow path of the one thermo-valve is connected with the delivery outlet or inlet of the other flow path of the other thermo-valve by fitting, thereby the one thermo-valve and the other thermo-valve are integrally formed, and a lid is attached to close the other flow path to the unconnected delivery outlet in the other flow path of the one thermo-valve or the unconnected delivery outlet of the other flow path of the other thermo-valve.

The connecting parts of the one thermo-valve are a recess part or protrusion formed on the outer circumference of the housing and the connecting parts of the other thermo-valve are protrusion or a recess part formed on the outer circumference of the housing; fitting the recess part or the protrusion of the one thermo-valve to the protrusion or the recess part of the other thermo-valve connects the connecting part of the one thermo-valve to the connecting part of the other thermo-valve and the one and other thermo-valves are desirably formed integrally.

Since fitting the recess part or the protrusion of the one thermo-valve to the protrusion or the recess part of the other thermo-valve connects the connecting part of the one thermo-valve to the connecting part of the other thermo-valve and the one and other thermo-valves are desirably formed integrally, the integration of thermo-valves is easily achieved.

It is desirable that the housing has a cylindrical shape and the recess parts at the connecting parts of the one and other thermo-valve are formed to extend in the axial direction and the protrusions at the connecting parts of the one and other thermo-valve are formed to extend in the axial direction.

Thus the one and other thermo-valves can be firmly connected without rattling using the recess part and the protrusion, extending in the axial direction of the housing.

A cross-sectional shape in the direction perpendicular to the axis of the housing of the protrusion at the connecting part of the one and other thermo-valves is desirably formed into an inverse triangle shape, whose base width widens as it protrudes from the outer circumference of the housing, and a recess portion extending in the axial direction of the housing is formed on the upper face of the protrusions. Further, a recess extending in the axial direction of the housing is formed on the upper surface of the protrusion, and the cross-sectional shape in the direction perpendicular to the axis of the housing is desirably formed to a triangular with a width that decreases as it projects from the outer circumference of the housing such that the recess of the connecting part of one thermo-valve and the connecting part of the other thermo-valve fits into the protrusion.

As described above, the cross-sectional shape of the protrusion is formed to be an inverted triangular shape with the width of its base becoming wider as protruding from the outer circumference of the housing, and in addition, a groove extending in the axial direction of the housing is formed on the upper face of the protrusion.

The cross-sectional shape of the recess parts at the connecting parts of the one and other thermo-valve is formed into a triangular shape whose base width of the recess becomes narrower as it protrudes from the outer circumference of the housing such that the recess portion at the connecting part of the one and other thermo-valve is fitted to the protrusion.

Therefore the one and the other thermo-valves can be firmly connected without rattling by fitting and connecting the recess part and the protrusion.

Further, since the groove extending in the axial direction of the housing is formed on the upper face of the protrusion, the upper face of the protrusion is subject to deform in the width direction, and the protrusion is easily housed in the recess parts of the connecting parts of the one and the other thermo-valves.

Further, the housing is formed in a cylindrical shape, and a connecting part of a one thermo-valve is provided with a first brim, on which a through hole is formed, extending outward from the housing, and a second brim, on which a protrusion is formed, extending outward from the housing. A connecting part of another thermo-valve is provided with a first brim, on which a through hole is formed, extending outward in the radial direction from the housing, and a second brim, on which a protrusion is formed, extending outward in the radial direction of the housing.

It is desirable that by fitting the through hole or the protrusion at the connecting part of the one thermo-valve is fitted to the protrusion or the through hole of the connecting part of the other thermo-valve, the one thermo-valve and the other thermo-valve are integrally connected.

Further, it is desirable that the protrusion is a cylindrical member, fitting the through hole, and a bolt that is to be screwed to a member to which the thermo-valve connecting body is attached is inserted into the cylindrical member. Thus, since the bolt that is to be threaded to a member to which the thermo-valve connecting body is attached is inserted into the cylindrical member, the thermo-valve connecting body can be attached to the member while preventing the integrated thermo-valve connecting body from separation.

Advantageous Effects of Invention

The present invention provides a connectable thermo-valve of easy-attaching work by integrating a plurality of thermo-valves into a single one. This integration allows thermo-valve connecting body obtainable with which the coolant flow control is achievable at a plurality of specific temperatures.

DESCRIPTION OF EMBODIMENTS

A thermo-valve and a thermo-valve connecting body according to the one embodiment of the present invention will be described below based on FIGS. 1 through 6. It is noted that the embodiments described below are not intended to limit the invention. The drawings are schematic, and the relationship between the dimensions of each element and the ratio of each element may differ between drawings.

One Embodiment

Figure 1:
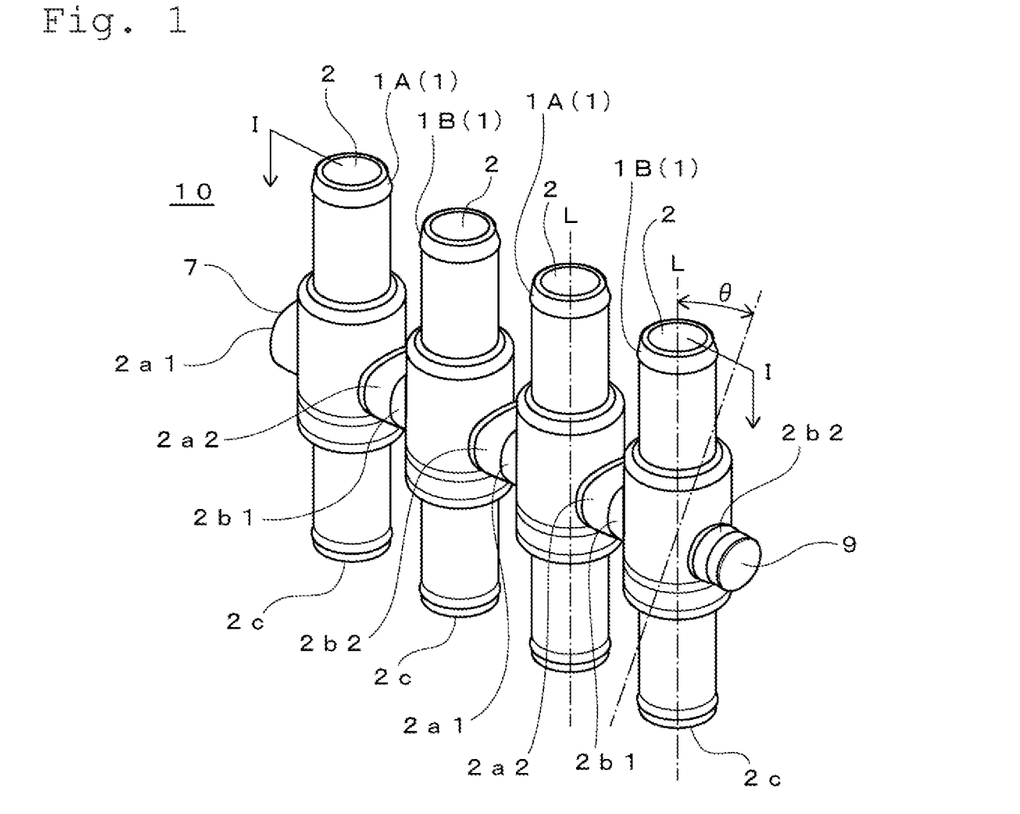
FIG. 1 is a perspective view illustrating the one embodiment of the thermo-valve connecting body (thermo-valves) according to the present invention.
Figure 2:
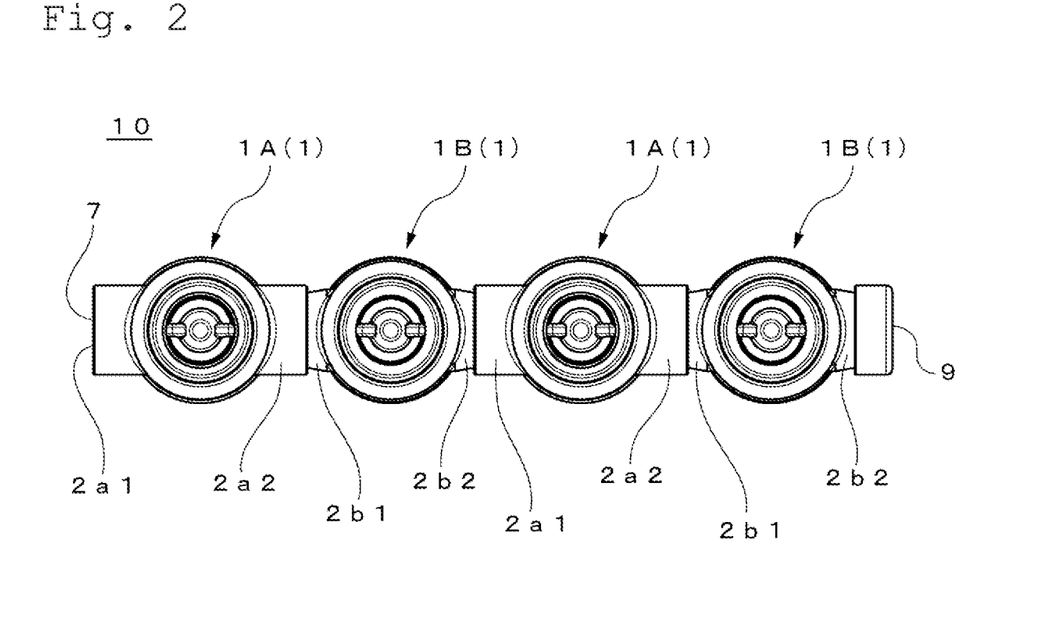
FIG. 2 is a plan view of the thermo-valve connecting body (thermo-valves) shown in FIG. 1.

The one embodiment of the thermo-valve connecting body will be described based on FIGS. 1 to 6. As shown in FIGS. 1 and 2, the thermo-valve connecting body 10 is composed of a thermo-valve 1A and a thermo-valve 1B which are connected alternately.

Since thermo-valve 1A and thermo-valve 1B, to be connected, have the same basic construction, regarding the basic structure thereof, using thermo-valve 1A, as an example, will be described based on FIG. 4. FIG. 4 is an II-II cross-sectional view of the thermo-valve connecting body shown in FIG. 3.

As shown in FIG. 4, the thermo-valve 1A is provided with a housing 3 where one flow path 2 is formed in which a coolant flows and a thermo-element 4, accommodated inside the housing 3, which includes a temperature sensing unit (a temperature sensor) 4a which senses the temperature of the coolant, and opens and closes the one flow path 2 in accordance with the coolant temperature.

As shown in FIG. 4, the thermo-element 4 is provided with the temperature sensing unit (a temperature sensor) 4a incorporating wax as a thermal expanding member which causes a piston to advance or retract by expansion or contraction due to temperature variation of the coolant, a valve element 4c which is driven by the temperature sensing unit (temperature sensor) 4a to seat on or unseat from a valve seat 4b to open or close the flow path 2, and a spring 4d as a biasing member which biases the valve element 4c to normally close (to seat on the valve seat 4b).

Further, the thermo-element 4 is provided with a piston guide 4a1, a piston 4a3 which advances or retracts guided by the piston guide 4a1 and the top end of which engages with a piston receiver 4a2, and a support 4a4 which supports the piston guide 4a1.

The valve seat 4b is formed on a stepped portion on the inner wall of the housing 3. The valve element 4c is formed on the upper face of the support 4a4. That is, the upper face of the support 4a4 functions as a valve element. An example of the thermo-element 4 is described above, but the configuration of the thermo-element according to the present invention is not limited to the above example and is changeable properly.

Figure 3:
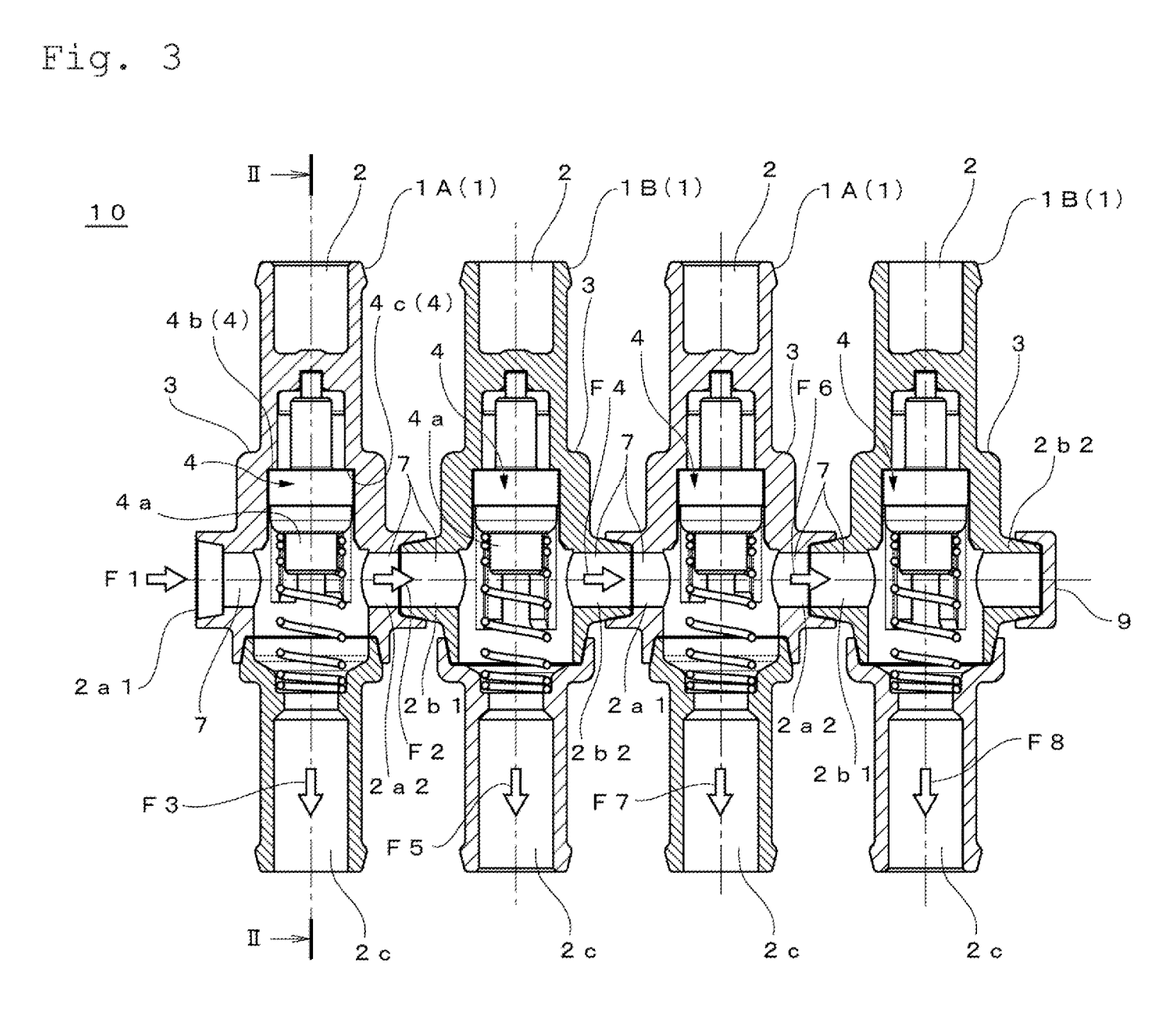
FIG. 3 is an I-I cross-sectional view of the thermo-valve connecting body (thermo-valves) shown in FIG. 1.
Figure 4:
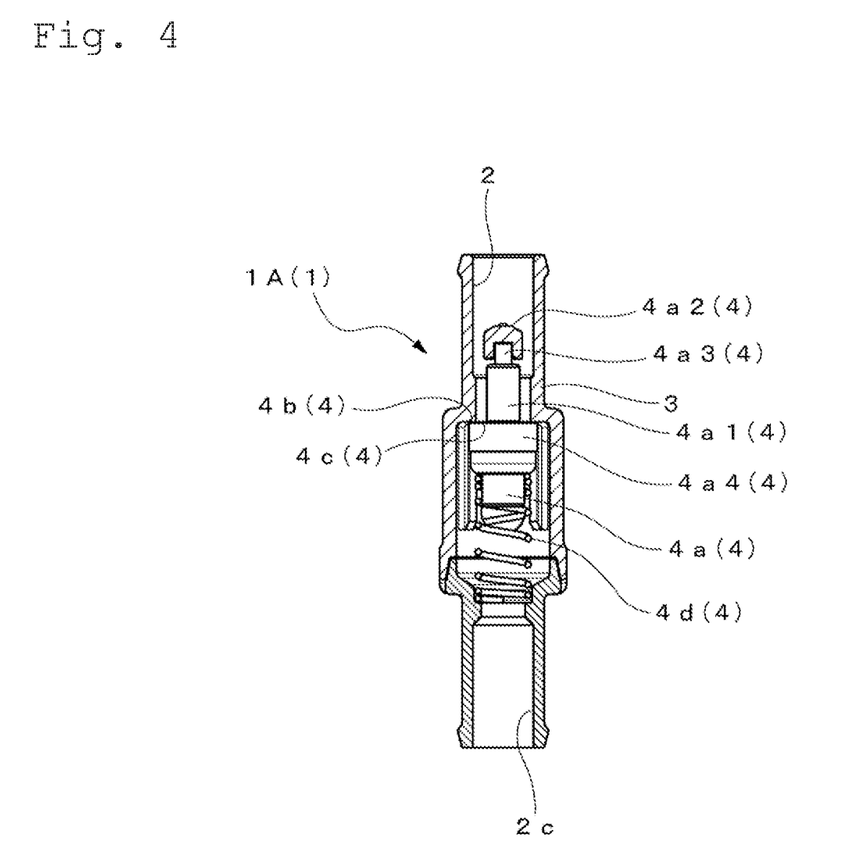
FIG. 4 is an II-II cross-sectional view of the thermo-valve connecting body in FIG. 3.

As shown in FIGS. 1 through 3, each of the thermo-valve 1A and 1B respectively has another flow path 7 intersecting with the one flow path 2, and a delivery inlet 2a1 and 2b1 from and a delivery outlet 2a2 and 2b2 to the other flow path 7, where those inlets and outlets are connecting parts protruding from the housing 3. The thermo-valve 1A and the thermo-valve 1B are alternately connected by fitting the delivery outlet 2a2 of the thermo-valve 1A to the delivery inlet 2b1 of the thermo-valve 1B.

The inner diameters of the delivery inlet 2a1 and the delivery outlet 2a2 of the other flow path 7, which are the connecting parts of the one thermo-valve 1A, are formed larger than the outer diameters of the delivery inlet 2b1 and the delivery outlet 2b2 of the other flow path 7, which are the connecting parts of the other thermo-valve 1B.

Further, the thermo-valve 1A is connected to the thermo-valve 1B by inserting and fitting the delivery inlet 2b1 of the other flow path 7 of the other thermo-valve 1B into the delivery outlet 2a2 of the other flow path 7 of the one thermo-valve 1A. Further, the thermo-valve 1A is connected to the thermo-valve 1B by entering and fitting the delivery outlet 2b2 of the other flow path 7 of the other thermo-valve 1B into the delivery inlet 2a1 of the other flow path 7 of the one thermo-valve 1A.

This enables the one thermo-valve 1A and the other thermo-valve 1B to be integrally formed. That is, the thermo-valve connecting body 10 shown in FIG. 3 is a four-thermo-valve connected body, in which the one thermo-valves 1A and the other thermo-valves 1B are alternately connected.

Though in FIGS. 1 through 3, 5, and 6, a thermo-valve connecting body in which four thermo-valves are connected is shown, the present invention is not limited to the thermo-valve connecting body in which four thermo-valves and may be applied to the one where two or more thermo-valves are connected.

Since the delivery outlet 2a2 of the one thermo-valve 1A is fitted to the delivery inlet 2b1 of the other thermo-valve 1B and the delivery outlet 2b2 of the other thermo-valve 1B is fitted to the delivery inlet 2a1 of a different one thermo-valve 1A, a connecting angle (attaching angle) can be set to any predetermined angle to connect.

Specifically, as shown in FIG. 1, the one thermo-valve 1A can be connected to the other thermo-valve 1B in a state where the axis L of the other thermo-valve 1B is rotated at a predetermined angle with respect to the axis L of the one thermo-valve 1A.

Since the delivery inlet and outlet of the other flow path of the one thermo-valve 1A can be attached to the delivery outlet and inlet of the other flow path of the other thermo-valve 1B at any predetermined attaching angle, the attaching angle can be set to the one according to the design specification.

Further, at the time of connecting the one thermo-valve 1A and the other thermo-valve 1B, it is desirable that the one thermo-valve 1A is made of a synthetic resin transparent to laser light and the other thermo-valve 1B is made of a synthetic resin opaque to laser light, and that the thermo-valves are desirably joined by laser welding after being fitted.

Thus, forming the one thermo-valve 1A and the other thermo-valve to be made of synthetic resins described above allows the contact surface of the delivery outlet 2a2 and the delivery inlet 2b1 or delivery outlet 2b2 and the delivery inlet 2a1 to be welded. This welding may be sufficient if made at least partially, and not necessary at the whole surface.

The one thermo-valve 1A and the other thermo-valve may be made of synthetic resins and be joined by ultrasonic vibration welding.

As described above, joining the one thermo-valve 1A and the other thermo-valve 1B by welding after connecting them more desirably allows for preventing the detaching of the one and other thermo-valves.

As shown in FIG. 3, a lid 9 for closing another flow path 7 is attached to the unconnected delivery outlet 2a2 or the unconnected outlet 2b2 of the other flow path 7 of the one or the other thermo-valve. FIG. 3 shows a state where the lid 9 is attached to the delivery outlet 2b2.

Further, in this embodiment, as shown in FIG. 3, the coolant introduced from the delivery inlet 2a1 of the other flow path 7 is supplied to the other thermo-valve through the delivery outlet 2a2, as described above; part of the coolant, however, is discharged from a discharging port 2c of a one flow path 2.

Further, the operating temperature of the temperature sensing unit 4a, shown in FIG. 3, is set at different temperatures for every thermo-valve 1. In this case, for the above reason, each thermo-element operates at different temperatures.

As a result, the temperatures of the coolant supplied to respective devices, such as the heater core 101, the ATF warmer 102, the exhaust gas recirculation EGR 103, and the throttle body 104 can be made different.

The action and operation of thus formed one embodiment will be described based on FIGS. 3, 5, and 6.

FIG. 3 shows a state where the thermo-elements 4 of all of the thermo-valves 1A closed with the valve element 4c in contact with the valve seat 4b. That is, FIG. 3 shows a state where the one flow path 2 is closed.

Further, the coolant is introduced from the delivery inlet 2a1 of the other flow path 7 of the one thermo-valve 1A (F1 in FIG. 3) and is delivered from the delivery outlet 2a2 of the other flow path 7 (F2 in FIG. 3) and discharged from the discharge port 2c (F3 in FIG. 3).

The coolant delivered from the delivery outlet 2a2 is introduced through the delivery inlet 2b1 of the connected other thermo-valve 1B (F2 in FIG. 3) and is delivered from the delivery outlet 2b2 of the other flow path 7 (F4 in FIG. 3) and is also discharged from the discharge port 2c (F5 in FIG. 3).

The coolant delivered (F4 in FIG. 3) from the delivery outlet 2b2 of the other flow path 7 is introduced through the delivery inlet 2a1 of the other flow path 7 of the one thermo-valve 1A (F4 in FIG. 3) and is delivered from the delivery outlet 2a2 of the other flow path 7 (F6 in FIG. 3) and is also discharged from the discharge port 2c (F7 in FIG. 3).

In addition, the coolant delivered from the delivery outlet 2a2 is introduced through the delivery inlet 2b1 of a connected other thermo-valve 1B (F6 in FIG. 3) and discharged from the discharge port 2c (F8 in FIG. 3). The delivery outlet 2b2 of the connected other thermo-valve 1B is closed with a lid 9.

Figure 5:
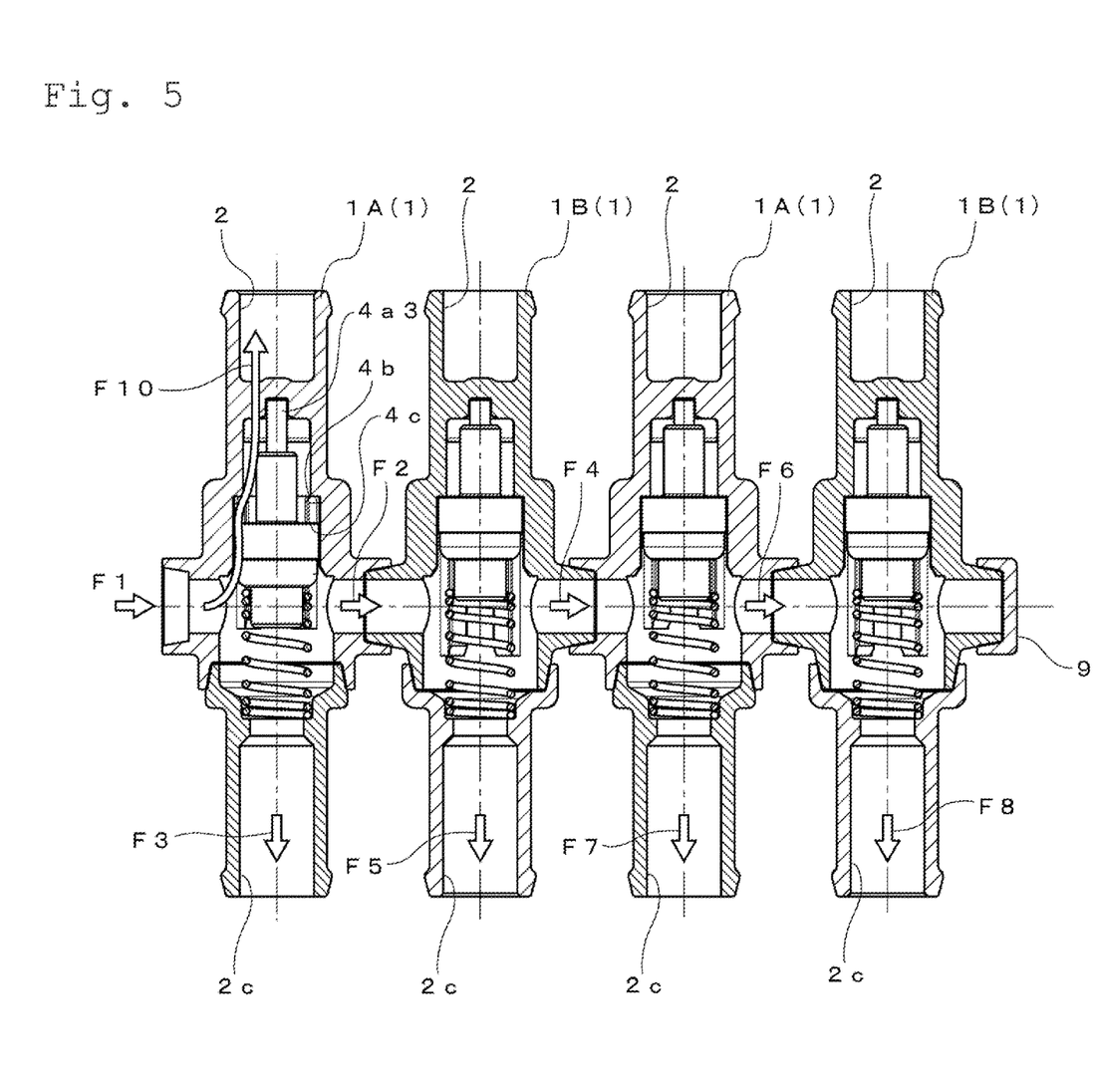
FIG. 5 is a cross-sectional view illustrating the operation status of the thermo-valve connecting body in FIG. 1, where the leftmost thermo-valve is open.

When, changed from the state shown in FIG. 3, the temperature of the coolant (F1 in FIG. 3) from the delivery inlet of the other flow path 7 rises, the temperature of the coolant around the temperature sensing unit 4a exceeds the predetermined temperature, and the wax in the temperature sensing unit 4a expands, then, as shown in FIG. 5, the piston 4a3 is pushed out, the valve element 4c unseats from the valve seat 4b to open the one flow path 2, a coolant flow is formed (F10 in FIG. 5).

That is, when the valve element 4c of the thermo-element 4 leaves the valve seat 4b, the one flow path 2 is communicated. This allows part of the coolant (F1 in FIG. 5) to be supplied to the heater core, for example.

Figure 6:
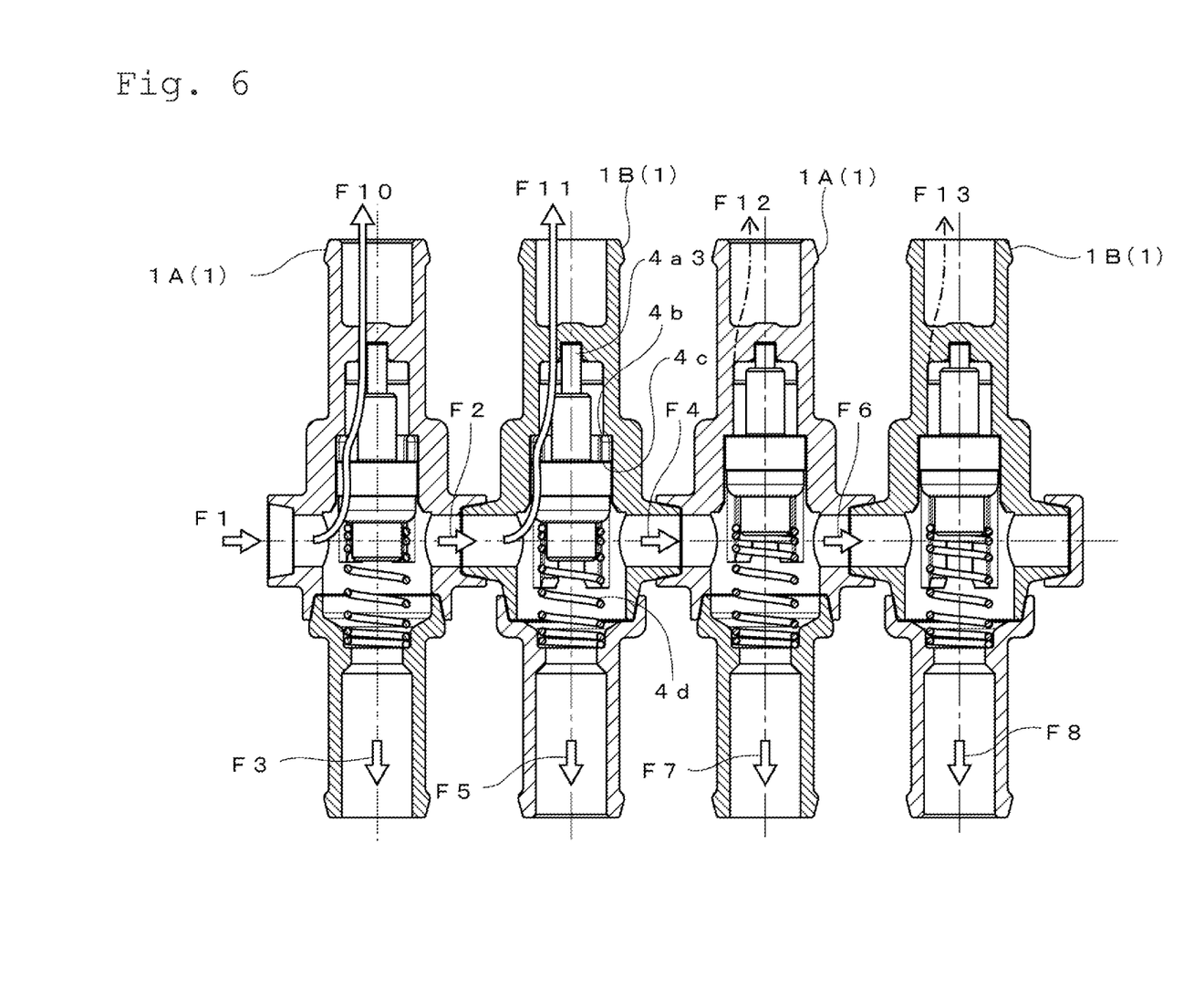
FIG. 6 is a cross-sectional view illustrating the transition of states from the state where the leftmost thermo-valve is open to the state where further the other thermo-valve from the leftmost one is open.

Further, when the temperature of the coolant around the temperature sensing unit 4a exceeds the predetermined temperature and the wax in the temperature sensing unit 4a of the other thermo-valve connected to the one thermo-valve 1A expands, as shown in FIG. 6, the piston 4a3 is pushed out, the valve element 4c unseats from the valve seat 4b to open the one flow path 2, and the flow of the coolant is established (F11 in FIG. 6).

Though not shown in drawings, in the same manner hereinafter, with the temperature rise of the cooling water, the paths of the thermo-valves are sequentially opened and the flows of the coolant F12 and F13 are formed.

In contrast, when the coolant temperature goes down, the wax incorporated in the temperature sensing unit 4a of the respective thermo-valve contracts sequentially, the piston 4a3 is pushed back by the biasing force of the spring 4d through the valve element 4c, the valve element 4c seats on the valve seat 4b, and the one flow path 2 is closed in order.

Thus, when the thermo-element 4 of each thermo-valve is closed in order, the communication of the one flow path 2 of each thermo-valve is shut; this causes the supply of the coolant supplied to the heater core to be stopped, for example.

In this one embodiment, the case where the coolant is introduced from the delivery inlet 2a1 of the other flow path 7 of the one thermo-valve 1A (F1 in FIG. 3) and is delivered from the delivery outlet 2a2 of the other flow path 7 (F2 in FIG. 3) and also discharged from the discharge port 2c (F3 in FIG. 3) is taken and described as an example of the invention. The invention, however, is not limited to this case.

For example, it may be configured that the coolant is introduced from the discharge port 2c in FIG. 3 and discharged from the delivery inlet 2a1 of the other flow path 7 of the one thermo-valve 1A located leftmost in FIG. 3.

Other Embodiment

Next, another embodiment of the thermo-valve connecting body will be described based on FIGS. 7 to 10. The same or equivalent members as in the one embodiment are named with the same reference signs, and detailed explanations are omitted.

Thermo-valves 1 used in the thermo-valve connecting body 10 has a cylindrical housing 3. The thermo-valve 1 has the same construction basically as the thermo-valve 1A other than the structure of delivery inlet 2a and outlet 2b (See FIG. 4)

As shown in FIGS. 7 to 10, a connecting part 3a is formed for attaching to other thermo-valves on the housing 3. The connecting part 3a is a protrusion 3b or a recess 3c formed on the outer circumferential surface of the housing 3 and is configured to be fitted with a recess 3c or a protrusion 3b formed on the outer circumferential surface of the housing 3 of the other thermo-valve 1.

Figure 7:
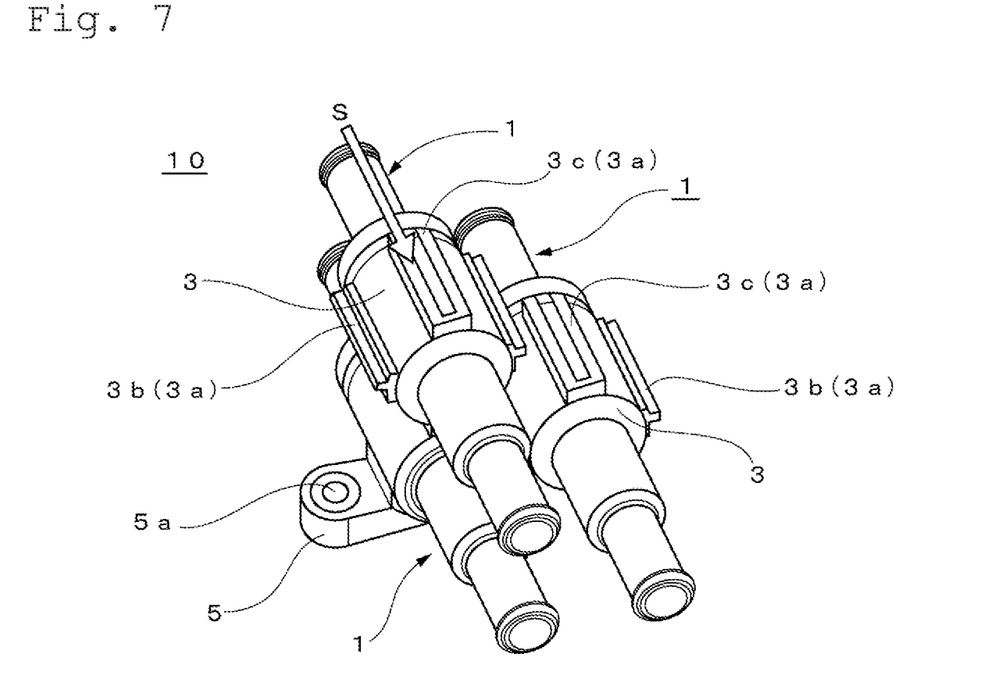
FIG. 7 is a perspective view illustrating the other embodiment of the thermo-valve connecting body (thermo-valves) according to the present invention.

The protrusions 3b and the recesses 3c are formed on the circumferential surface of the housing 3 of a one and other thermo-valve 1 alternately with an angle of 90 degrees to each other.

Further, the one thermo-valve 1 is attached to the connecting part 3a of the other thermo-valve 1, and the one thermo-valve 1 and the other thermo-valve 1 are integrally formed to configure a thermo-valve connecting body 10.

Figure 8:
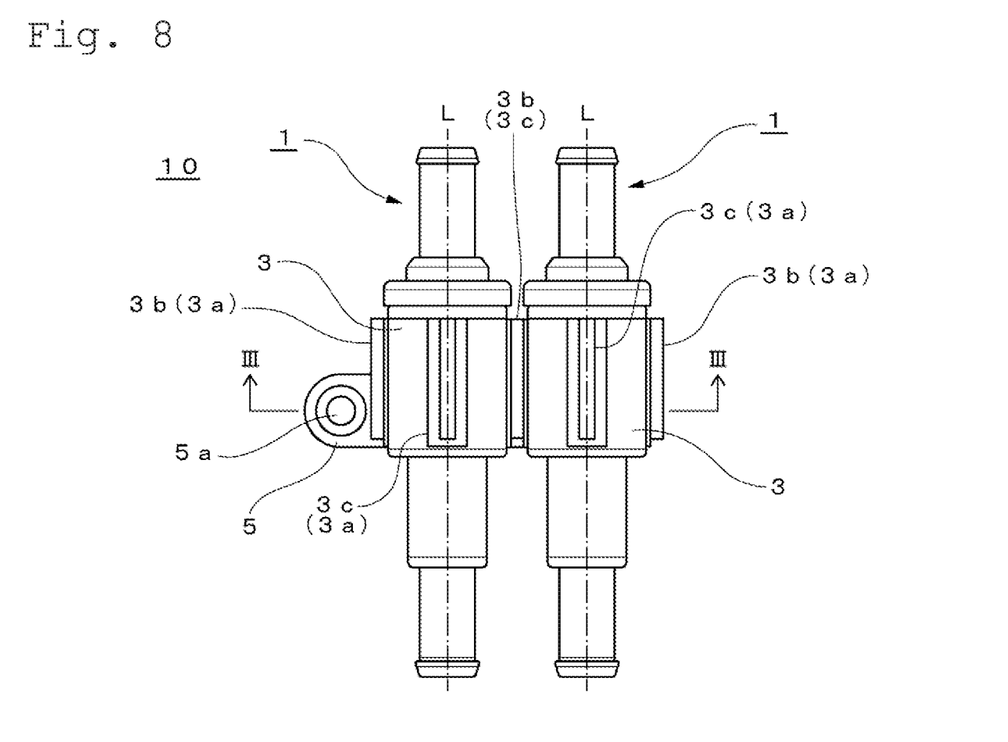
FIG. 8 is a side view of the thermo-valve connecting body shown in FIG. 7.

The recess 3c and the protrusion 3b of the connecting part 3a will be described based on FIGS. 8 to 10. The recess 3c and the protrusion 3b of the thermo-valve 1 extend in the axial direction L of the housing 3, as shown in FIG. 8.

Figure 9:
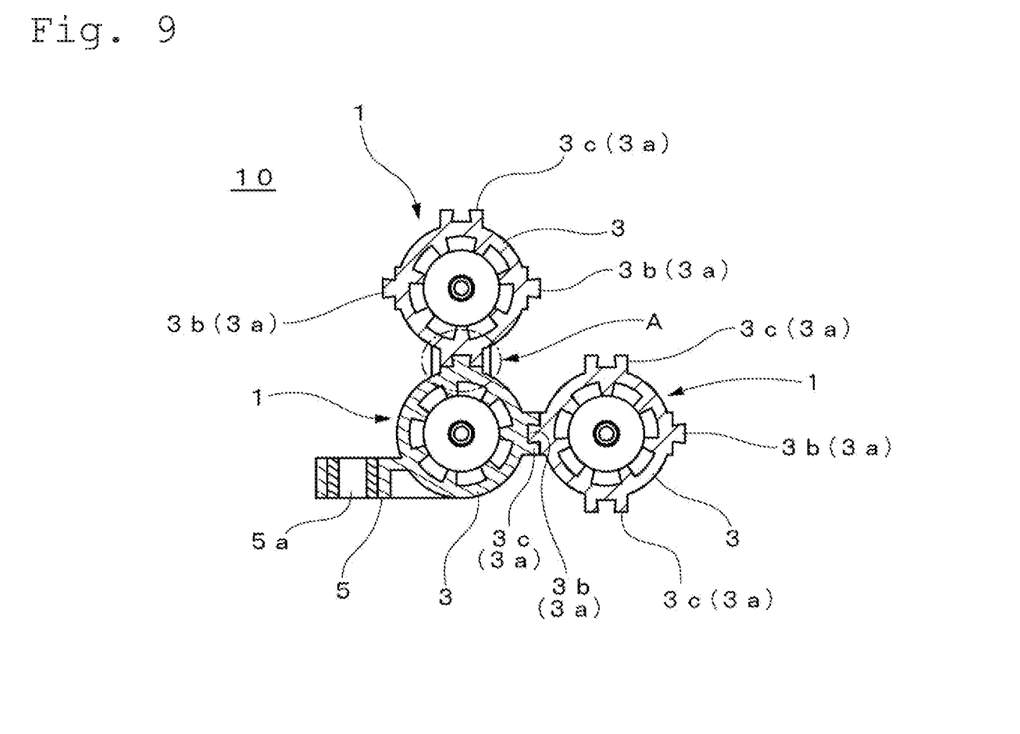
FIG. 9 is an III-III cross-sectional view of the thermo-valve connecting body in FIG. 8.
Figure 10:
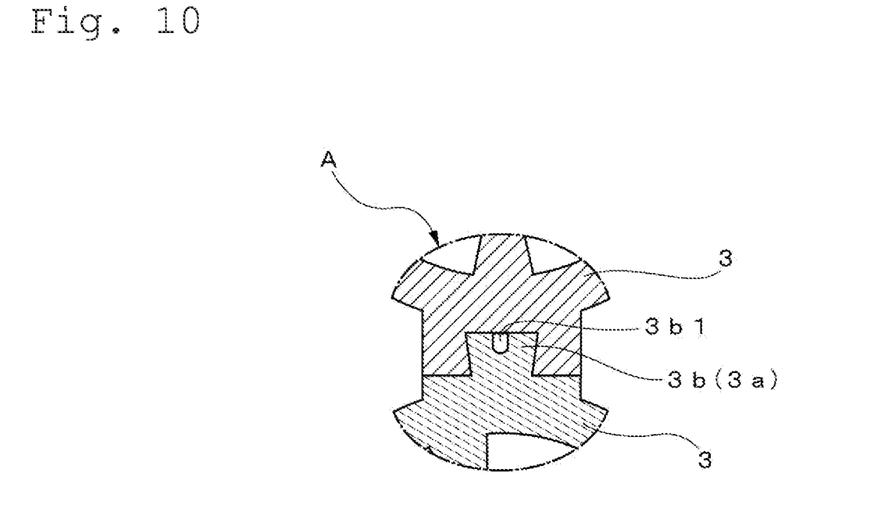
FIG. 10 is an enlarged view of the region A in FIG. 9.
Figure 11:
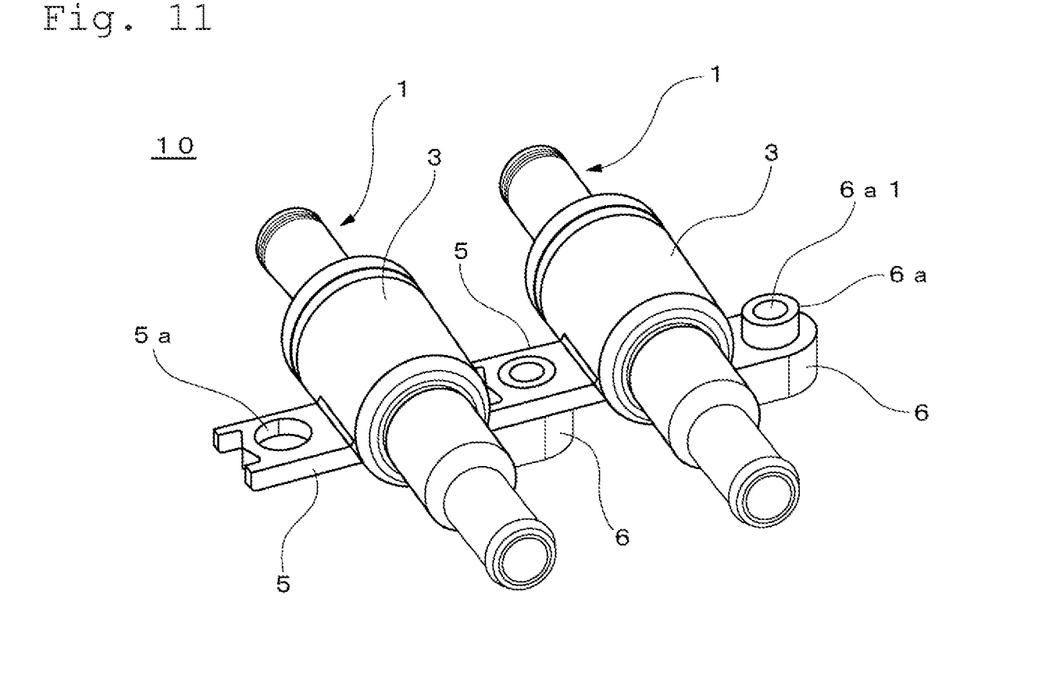
FIG. 11 is a perspective view illustrating the third embodiment of the thermo-valve (thermo-valve connecting body) according to the present invention.
Figure 12:
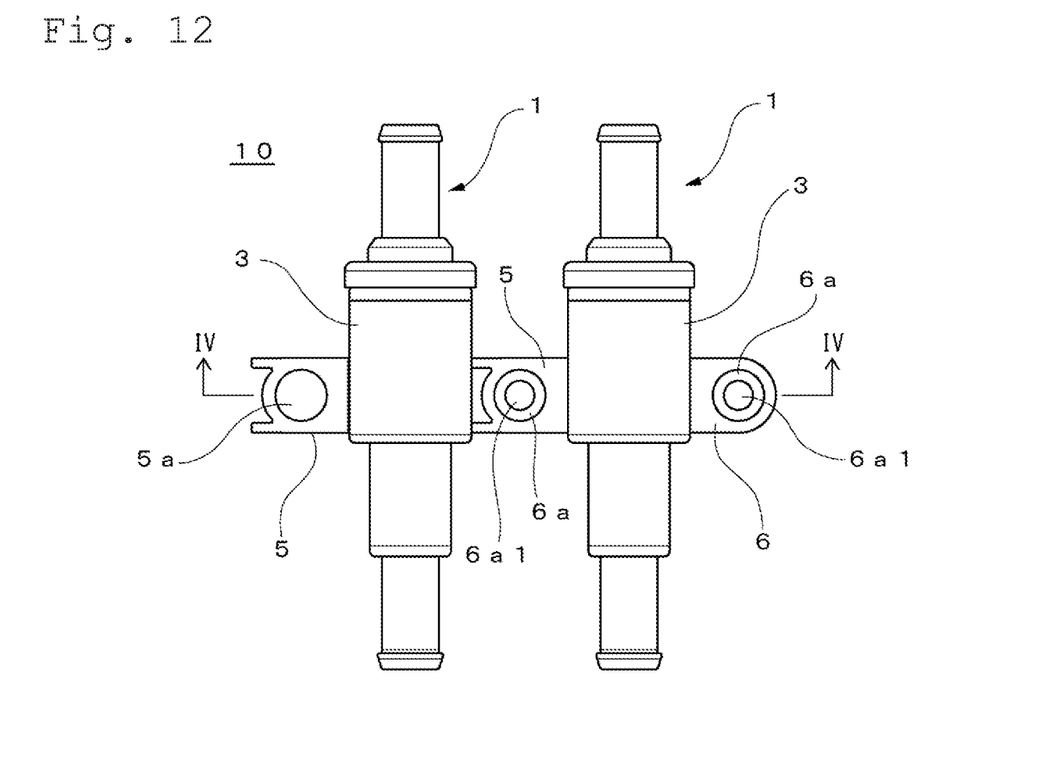
FIG. 12 is a side view of the thermo-valves (thermo-valve connecting body) shown in FIG. 11.

As shown in FIGS. 9 and 10, the cross-sectional shape of the protrusion 3b on the connecting part 3a of the thermo-valve 1 in a direction perpendicular to the axial direction L of the housing 3 is formed to have an inverted triangular shape whose base width increases as protrudes from the circumferential surface of the housing 3. Further, a groove 3b1 extending in the axial direction of the housing 3 is formed on the upper surface of the protrusion 3b.

As shown in FIGS. 10, the cross-sectional shape of the recess 3c of the connecting part 3a of the thermo-valve 1 in a direction perpendicular to the axial direction L of the housing 3 is formed to have a triangular shape whose base width decreases as protruding from the circumferential surface of the housing 3.

As described above, the recess 3c and the protrusion 3b are formed to extend in the axial direction L of the housing 3. The cross-sectional shape of the protrusion 3b is formed to have an inverted triangular shape whose base width increases as protrudes from the circumferential surface of the housing 3, and the cross-sectional shape of the recess 3c is formed to have a triangular shape whose base width decreases as protrudes from the circumferential surface of the housing 3.

As indicated by arrow S in FIG. 7, the protrusion 3b and recess 3c are joined by inserting the protrusion 3b from the end of the recess 3c, relatively moving the protrusion 3b and recess 3c along the axial direction of the housing 3 and accommodating the protrusion 3b into the recess 3c.

Further, forming a groove 3b1 on the upper surface of the protrusion 3b extending in the axial direction of the housing 3 allows to easily accommodate the protrusion 3b in the recess 3c due to the easily deformable upper surface of the protrusion 3b in the width direction.

Further, as shown in FIGS. 7 to 9, a brim 5 having a through hole 5a is formed on the outer circumferential surface of the one thermo-valve 1. The brim 5 is for fixing the thermo-valve connecting body 10 at a predetermined position by inserting a bolt, not shown, through the through hole 5a.

In the above embodiment, the recess 3c or the protrusion 3b extending in the axial direction L of the housing 3 is illustrated as a shape of the recess 3c or the protrusion 3b formed on the outer circumferential surface of the housing 3, but the present invention is not limited by the embodiment. For example, the recess may be a cylindrical recess that does not extend in the axial direction of the housing 3, and the protrusion may be a columnar protrusion that does not extend in the axial direction of the housing 3.

Third Embodiment

A third embodiment of the thermo-valve connecting body will be described based on FIGS. 11 to 14. The same or equivalent members as in the one embodiment are named with the same reference signs, and detailed explanations are omitted.

A thermo-valve used for the thermo-valve connecting body 10 includes a cylindrical housing 3.

The thermo-valve 1 includes a housing 3 that has a first brim 5 extending outward having a through hole 5a formed in the one brim 5, and a second brim 6 extending outward having a protrusion 6a formed in the other brim 6.

A through hole 6a1 is formed at the center of the protrusion 6a, which causes the protrusion 6a to form a cylindrical shape. The cylindrical protrusion 6a is configured to fit into the through hole 5a of the brim 5.

Figure 13:
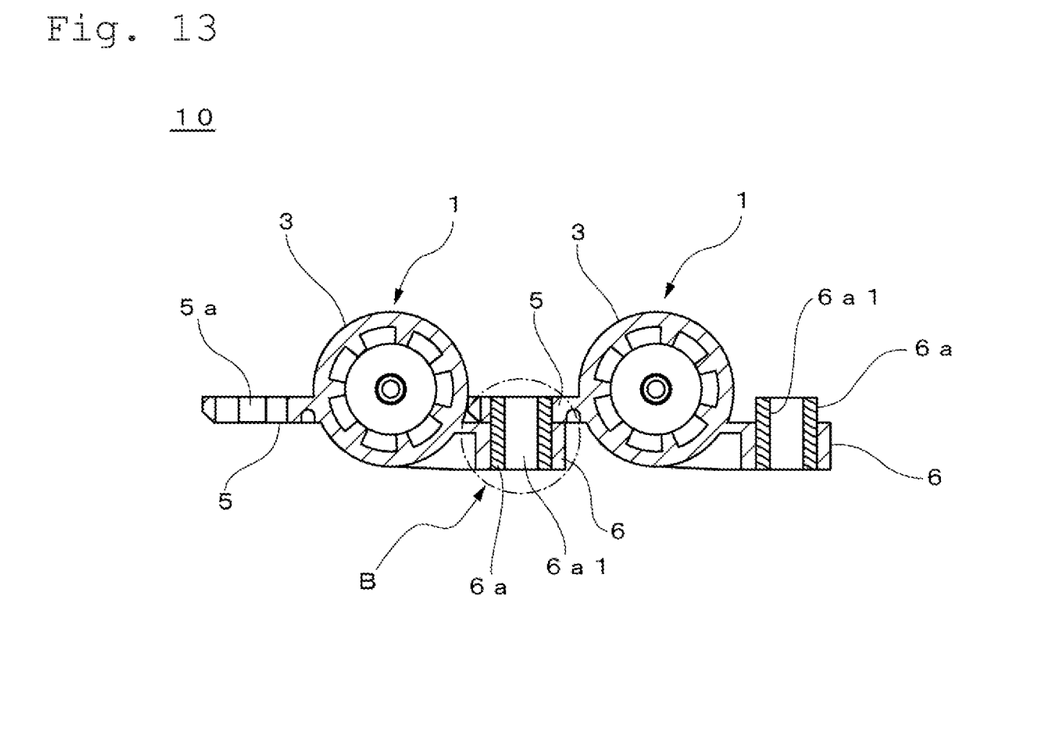
FIG. 13 an IV-IV cross-sectional view of the thermo-valve connecting body in FIG. 12.
Figure 14A:
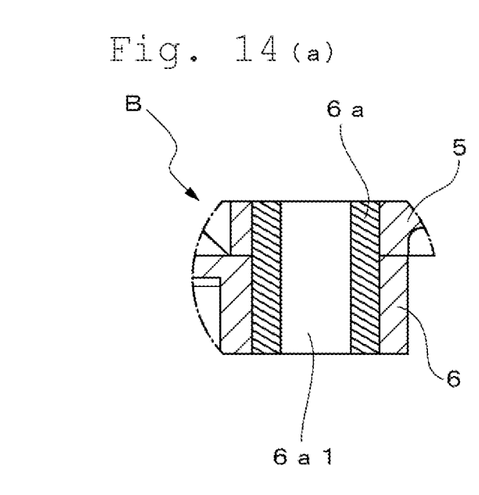
FIG. 14(a) is an enlarged view of region B in FIG. 13.
Figure 14B:
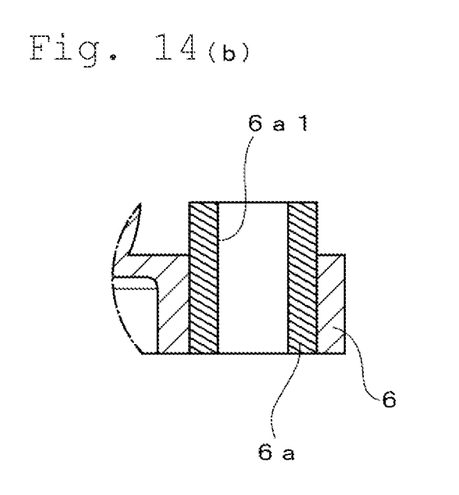
FIG. 14(b) is an enlarged view illustrating a state where one of the brims of the thermo-valves is detached.

As shown in FIG. 13, the second brim 6 is formed to be located at a lower position against the first brim 5 (the distance from the horizontal plane including the axis of housing 3 is greater to the brim 6 than that to the brim 5).

Further, the through hole 5a of the first brim 5 or the protrusion 6a of the second brim 6 of the one thermo-valve 1 fits into the protrusion 6a of the second brim 6 or the through hole 5a of the first brim 5 in the connecting part of the other thermo-valve 1, whereby the one thermo-valve 1 and the other thermo-valve 1 are connected and formed to a single body.

As shown in FIG. 13, the first brim 5 is placed on the upper face of the second brim 6; that is, the protrusion 6a of the second brim 6 of the one thermo-valve 1 is fitted into the through hole 5a of the first brim 5 of the other thermo-valve 1.

Further, a bolt (not shown) is inserted into the through hole 6a1 formed in the protrusion 6a and is screwed into a fixing member for the thermo-valve connecting body, thereby fixing the one thermo-valve 1 to the other thermo-valve 1.

Thus, the thermo-valve connecting body formed by connecting the one thermo-valve 1 and the other thermo-valve 1 can be easily secured to the fixing member with a bolt.

REFERENCE SIGNS LIST

1 Thermo-valve
1A one thermo-valve
2a1 delivery inlet
2a2 delivery outlet
2c discharge port
1B other thermo-valve
2b1 delivery inlet
2b2 delivery outlet
2c discharge port
2 one flow path
3 housing
4 thermo-element
5 first brim
5a through hole
6 second brim
6a protrusion
6a1 through hole
7 other flow path
9 lid
10 thermo-valve connecting body

The invention claimed is:
1. A thermo-valve comprising:
a housing in which one flow path is formed where a coolant flows;
a thermo-element, accommodated in the housing, which includes a temperature sensing unit sensing temperature of the coolant, and which opens and closes the one flow path in accordance with the temperature of the coolant; and
a connecting part formed in the housing to be attached to a housing of another thermo-valve.

2. The thermo-valve according to claim 1, wherein the housing is formed separately from the housing of the another thermos-valve and connected thereto through the connecting part.

3. A thermo-valve connecting body, comprising:
one thermo-valve comprising a housing in which one flow path is formed where a coolant flows,
a thermo-element accommodated in the housing, which includes a temperature sensing unit sensing temperature of the coolant, the thermo-element opening and closing the one flow path in accordance with the temperature of the coolant, and
a connecting part formed in the housing; and
another thermo-valve comprising
a housing in which one flow path is formed where the coolant flows,
a thermo-element accommodated in the housing of the another thermo-valve, which includes a temperature sensing unit sensing temperature of the coolant, the thermo-element opening and closing the one flow path of the another thermo-valve in accordance with the temperature of the coolant, and
a connecting part formed in the housing of the another thermo-valve to be attached to the one thermo-valve,
wherein the one thermo-valve is attached to the connecting part of the another thermo-valve through the connecting part formed in the housing of the one thermo-valve, whereby the one thermo-valve and the another thermo-valve are integrally formed to a single body.

4. The thermo-valve connecting body according to claim 3,
wherein the connecting part of the one thermo-valve is a recess or a protrusion formed on an outer circumference of the housing and the connecting part of the another thermo-valve is a protrusion or a recess formed on an outer circumference of the housing, and by fitting the recess or the protrusion of the connecting part of the one thermo-valve to the protrusion or the recess of the connecting part of the another thermo-valve, the connecting part of the one thermo-valve is attached to the connecting part of the another thermo-valve to integrally form the one thermo-valve and the another thermo-valve.

5. The thermo-valve connecting body according to claim 4,
wherein the housings are formed to be a cylindrical shape, the recess of the connecting part of the one thermo-valve and the recess of the connecting part of the another thermo-valve extend in axial directions of the housings, and the protrusion of the connecting part of the one thermo-valve and the protrusion of the connecting part of the another thermo-valve extend in axial directions of the housings.

6. The thermo-valve connecting body according to claim 5,
wherein a cross-sectional shape in a direction perpendicular to an axis of the housing of the protrusion of the connecting part of the one thermo-valve and a cross-sectional shape in a direction perpendicular to an axis of the housing of the protrusion of the connecting part of the another thermo-valve are respectively formed into an inverted triangular shape whose width increases as it protrudes from an outer circumference of the housing, and a groove extending in the axial direction of each of the housings is formed on an upper face of each of the protrusions, and a cross-sectional shape in a direction perpendicular to an axis of the housing of the recess of the connecting part of the one thermo-valve and a cross-sectional shape in a direction perpendicular to an axis of the housing of the recess of the connection part of the another thermo-valve are formed respectively to be a triangle whose width decreases as it protrudes from the outer circumference of each of the housings.

7. The thermo-valve connecting body according to claim 3, wherein
the housings are formed in a cylindrical shape,
the connecting part of the one thermo-valve is provided with a first brim, on which a through hole is formed, extending outward from the housing thereof, and a second brim, on which a protrusion is formed, extending outward in a radial direction from the housing thereof,
the connecting part of the another thermo-valve is provided with a first brim, on which a through hole is formed, extending outward in a radial direction from the housing thereof, and a second brim, on which a protrusion is formed, extending outward in a radial direction of the housing thereof, and
fitting the through hole or the protrusion formed on the connecting part of the one thermo-valve to the protrusion or the through hole formed on the connecting part of the another thermo-valve connects the one thermo-valve and the another thermo-valve to be formed integrally.

8. The thermo-valve connecting body according to claim 7, wherein each of the protrusions is a cylindrical member that fits into each of the through holes corresponding thereto, and a bolt to be screwed to a member to which the thermo-valve connecting body is attached is inserted through the cylindrical member.

9. A thermo-valve, comprising
a housing in which one flow path is formed where a coolant flows;
a thermo-element accommodated in the housing which includes a temperature sensing unit sensing temperature of the coolant, the thermo-element opening and closing the one flow path in accordance with the temperature of the coolant;
another flow path intersecting with the one flow path; and
a delivery inlet and a delivery outlet of the another flow path which are connecting parts formed protruding from the housing,
wherein the delivery inlet of the another flow path is fitted and connected to a delivery outlet of still another flow path of another thermo-valve, or the delivery outlet of the another flow path is fitted and connected to a delivery inlet of the still another flow path of the another thermo-valve to connect the another thermo-valve integrally.

10. A thermo-valve connecting body, comprising:
one thermo-valve comprising:
a housing in which one flow path is formed where a coolant flows;
a thermo-element accommodated in the housing, which includes a temperature sensing unit sensing temperature of the coolant, the thermo-element opening and closing the one flow path in accordance with the temperature of the coolant;
another flow path intersecting the one flow path; and
a delivery inlet and a delivery outlet of the another flow path which are connecting parts formed by protruding from the housing; and another thermo-valve comprising:
a housing in which one flow path is formed where the coolant flows;
a thermo-element accommodated in the housing, which includes a temperature sensing unit sensing the temperature of the coolant, the thermo-element opening and closing the one flow path in accordance with the temperature of the coolant;
another flow path intersecting the one flow path; and
a delivery inlet and a delivery outlet of the another flow path which are connecting parts formed by protruding from the housing,
wherein the delivery inlet of the another flow path of the one thermo-valve is fitted to connect to the delivery outlet of the another flow path of the another thermo-valve, or
the delivery outlet of the another flow path of the one thermo-valve is fitted to connect to the delivery inlet of the another flow path of the another thermo-valve, whereby the one thermo-valve and the other thermo-valve are integrally formed to a single body.

11. The thermo-valve connecting body according to claim 10, wherein inner diameters of the delivery inlet and the delivery outlet of the another flow path, which are connecting parts of the one thermo-valve, are formed to be larger than outer diameters of the delivery inlet and the delivery outlet of the another flow path, which are connecting parts of the another thermo-valve.

12. The thermo-valve connecting body according to claim 10,
wherein the delivery inlet and the delivery outlet of the another flow path of the one thermo-valve are attached to the delivery inlet and the delivery outlet of the another flow path of the another thermo-valve at a predetermined angle of attachment, and the one thermo-valve and the another thermo-valve are welded.

13. The thermo-valve connecting body according to claim 10,
wherein the delivery inlet of the another flow path of the one thermo-valve is connected to the delivery outlet of the another flow path of the another thermo-valve by fitting, or the delivery outlet of the another flow path of the one thermo-valve is connected to the delivery inlet of the another flow path of the another thermo-valve by fitting, whereby the one thermo-valve and the another thermo-valve are integrally formed, and further,
a lid for closing the another flow path is attached to an unconnected delivery outlet of the another flow path of the one thermo-valve or an unconnected delivery outlet of the another flow path of the another thermo-valve.

* * * * *